US012625641B2

(12) United States Patent
Jang

(10) Patent No.: US 12,625,641 B2
(45) Date of Patent: May 12, 2026

(54) MEMORY CONTROLLER AND METHOD OF OPERATING THE SAME

(71) Applicant: SK hynix Inc., Gyeonggi-do (KR)

(72) Inventor: In Jong Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 74 days.

(21) Appl. No.: 18/588,365

(22) Filed: Feb. 27, 2024

(65) Prior Publication Data

US 2025/0036301 A1     Jan. 30, 2025

(30) Foreign Application Priority Data

Jul. 24, 2023    (KR) ........................ 10-2023-0096047

(51) Int. Cl.
G06F 3/06              (2006.01)
(52) U.S. Cl.
CPC .......... G06F 3/0655 (2013.01); G06F 3/0604 (2013.01); G06F 3/064 (2013.01); G06F 3/0679 (2013.01)
(58) Field of Classification Search
CPC ...... G06F 3/0655; G06F 3/0604; G06F 3/064; G06F 3/0679; G06F 3/0614; G06F 3/0658; G06F 12/0253; G06F 2212/1032; G06F 2212/7205
See application file for complete search history.

(56) References Cited

U.S. PATENT DOCUMENTS

| | | | |
|---|---|---|---|
| 2014/0184165 A1* | 7/2014 | Takahashi ............. | H01M 10/48 |
| | | | 429/90 |
| 2020/0401513 A1* | 12/2020 | He ...................... | G06F 12/0253 |
| 2021/0200700 A1* | 7/2021 | Tanpairoj ................ | G06F 3/061 |
| 2021/0263647 A1* | 8/2021 | You .......................... | G06F 3/061 |
| 2022/0164283 A1* | 5/2022 | Mauro .................. | G06F 1/3212 |

FOREIGN PATENT DOCUMENTS

KR          102352738 B1     1/2022

* cited by examiner

*Primary Examiner* — Francisco A Grullon
(74) *Attorney, Agent, or Firm* — IP & T GROUP LLP

(57)          ABSTRACT

Provided herein are a memory controller and a method of operating the same. The memory controller may include a background condition storage and a background controller. The background condition storage may be configured to store a trigger condition for each background operation for a memory device in each of a non-charging mode and a charging mode associated with a battery for the memory controller. The background controller may be configured to change the trigger condition from a non-charging condition to a charging condition depending on charging information indicating whether the battery for the memory controller is in a charging state. The trigger condition is mitigated in the charging condition compared to the non-charging condition.

18 Claims, 13 Drawing Sheets

FIG. 5

Background Condition
Storage 1

| Background Operation | Operation Condition | Non-charging Condition | Charging Condition |
|---|---|---|---|
| Garbage Collection | Dirty Level | A1 | A2(<A1) |
| | Victim Block Invalid Page Count | B1 | B2(<B1) |

FIG. 7

Background Condition
Storage b

| Background Operation | Operation Condition | Non-charging Condition | Charging Condition |
|---|---|---|---|
| Read Reclaim | Read Count | C1 | C2(<C1) |
| | Error Bits | D1 | D2(<D1) |
| | Test Read Interval | E1 | E2(<E1) |

Read Reclaim

Read Count

FIG. 8B

Read Reclaim

Error Bits

| BLK1 | 10 |
| BLK2 | 20 |  ~TH2=20
| BLK3 | 30 |  ~TH1=30
| BLK4 | 15 |

Read Reclaim

Test Read 1          Test Read 2          Test Read 3

Interval 1          Interval 1

Test Read 1    Test Read 2    Test Read 3    Test Read 4

Interval 2    Interval 2    Interval 2

Background Condition
Storage c

| Background Operation | Operation Condition | Non-charging Condition | Charging Condition |
|---|---|---|---|
| Wear Leveling | E/W Count | F1 | F2(<F1) |

MEMORY CONTROLLER AND METHOD OF OPERATING THE SAME

CROSS-REFERENCE TO RELATED APPLICATION

The present application claims priority under 35 U.S.C. § 119(a) to Korean patent application number 10-2023-0096047 filed on Jul. 24, 2023, the entire disclosure of which is incorporated by reference herein.

BACKGROUND

1. Field of Invention

Various embodiments of the present disclosure generally relate to an electronic device, and more particularly, to a memory controller and a method of operating the memory controller.

2. Description of Related Art

A storage device is a device which stores data under the control of a host device, such as a computer or a smartphone. A storage device may include a memory device in which data is stored and a memory controller which controls the memory device. Such memory devices are classified into a volatile memory device and a nonvolatile memory device.

The memory controller may perform background operations on the memory device to improve the reliability of the memory device and increase the lifespan of the memory device. The background operations may include garbage collection, a read reclaim operation, wear leveling, etc. The memory controller may receive charging information from the host indicating whether a battery which supplies power to the storage device is in a charging state, and may change an execution condition for each background operation so that the corresponding background operation is performed by consuming more power depending on the charging information.

SUMMARY

Various embodiments of the present disclosure are directed to a storage device which performs background operations in a stabilized power state, and a method of operating the storage device.

An embodiment of the present disclosure may provide for a memory controller. The memory controller may include a background condition storage and a background controller. The background condition storage may be configured to store a trigger condition for each background operation for a memory device in each of a non-charging mode and a charging mode associated with a battery for the memory controller. The background controller may be configured to change the trigger condition from a non-charging condition to a charging condition depending on charging information indicating whether the battery for the memory controller is in a charging state. The trigger condition is mitigated in the charging condition compared to the non-charging condition.

An embodiment of the present disclosure may provide for a method of operating a memory controller. The method may include receiving from a host charging information indicating whether a battery for the memory controller is in a charging state, changing a trigger condition for a background operation for a memory device to a charging condition that is mitigated compared to a non-charging condition, and performing the background operation on the memory device based on the trigger condition corresponding to the charging condition.

These and other features and advantages of the invention will become apparent from the detailed description of embodiments of the present disclosure and the following figures.

BRIEF DESCRIPTION OF THE DRAWINGS

FIG. 5 is a diagram illustrating a background condition storage in which conditions regarding garbage collection are stored according to an embodiment of the present disclosure.

FIG. 7 is a diagram illustrating a background condition storage in which conditions regarding a read reclaim operation are stored according to an embodiment of the present disclosure.

FIG. 8B is a diagram illustrating the number of error bits that is a trigger condition for a read reclaim operation.

DETAILED DESCRIPTION

Specific structural or functional descriptions in the embodiments according to the concept of the present disclosure introduced in this specification are only for description of the embodiments according to the concept of the present disclosure. The embodiments according to the concept of the present disclosure may be practiced in various forms and should not be construed as being limited to the embodiments described in the specification.

Figure 1:
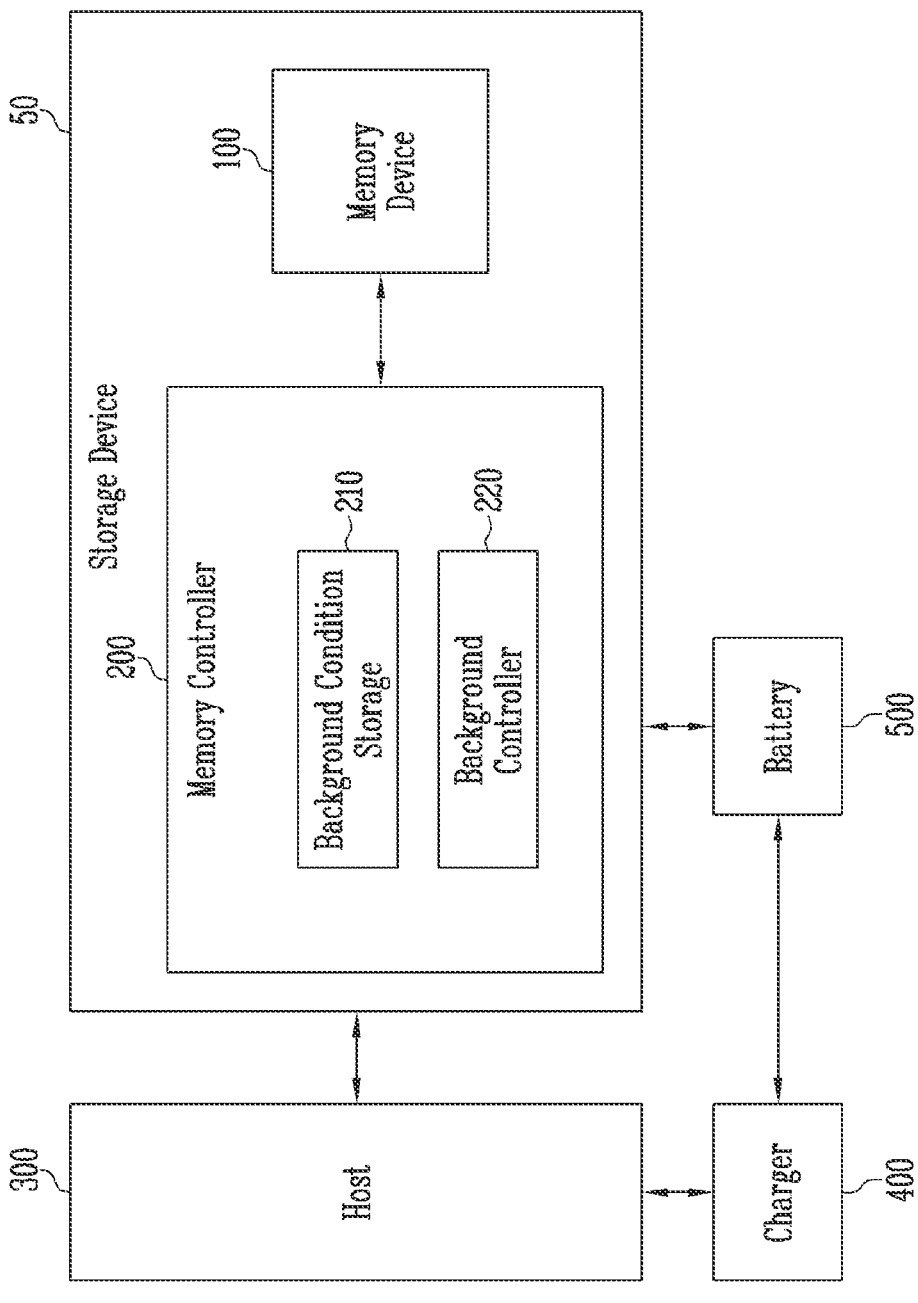
FIG. 1 is a diagram illustrating a storage device according to an embodiment of the present disclosure.

FIG. 1 is a diagram illustrating a storage device 50 according to an embodiment of the present disclosure.

Referring to FIG. 1, the storage device 50 may include a memory device 100 and a memory controller 200 which controls the operation of the memory device 100. The storage device 50 may be a device which stores data under the control of a host 300, such as a mobile phone, a smartphone, a smart wearable device, an MP3 player, a laptop computer, a desktop computer, a game console, a television (TV), a tablet PC, or an in-vehicle infotainment system.

The storage device 50 may be manufactured as any of various types of storage devices depending on a scheme for communication with the host 300. For example, the storage device 50 may be implemented as any of various types of storage devices, for example, a solid state drive (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a peripheral component interconnection (PCI)—card type storage device, a PCI express (PCI-e or PCIe) card-type storage device, a compact flash (CF) card, a smart media card, and a memory stick.

The storage device 50 may be manufactured in any of various types of package forms. For example, the storage device 50 may be manufactured in any of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 may be operated in response to the control of the memory controller 200. The memory device 100 may include a plurality of memory blocks. Each memory block may include a plurality of memory cells which store data. Memory cells coupled to the same word line, among the plurality of memory cells, may be defined as one physical page.

In an embodiment, the memory device 100 may take many alternative forms, such as a random access memory (RAM), a nonvolatile memory (NVM), a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus DRAM (RDRAM), a NAND flash memory, a resistive RAM (RRAM), a phase-change RAM (PRAM), a magnetoresistive RAM (MRAM), a ferroelectric RAM (FRAM), or a spin transfer torque RAM (STT-RAM).

The memory device 100 may receive a command and an address from the memory controller 200 and may access an area selected by the address among storage areas. That is, the memory device 100 may perform an operation indicated by the command on the area selected by the address. For example, the memory device 100 may perform a write operation (program operation), a read operation, and an erase operation. During the program operation, the memory device 100 may program data to the area selected by the address. During the read operation, the memory device 100 may read data stored in the area selected by the address. During the erase operation, the memory device 100 may erase data stored in the area selected by the address.

The memory controller 200 controls the overall operation of the storage device 50.

In an embodiment, the memory controller 200 may receive data and a logical address from the host 300, and may translate the logical address into a physical address indicating the address of memory cells which are included in the memory device 100 and in which the data is to be stored.

The memory controller 200 may control the memory device 100 so that a program operation, a read operation or an erase operation is performed in response to a request received from the host 300. During the program operation, the memory controller 200 may provide a write command, a physical address, and data to the memory device 100. During the read operation, the memory controller 200 may provide a read command and a physical address to the memory device 100. During the erase operation, the memory controller 200 may provide an erase command and a physical address to the memory device 100.

In an embodiment, the memory controller 200 may include a background condition storage 210 and a background controller 220.

The background condition storage 210 may store conditions for background operations performed on the memory device 100. The background operations may include garbage collection, a read reclaim operation, wear leveling, etc. The background condition storage 210 may store respective trigger conditions for the background operations in a non-charging mode and a charging mode. The charging mode may be a mode in which the storage device 50 is operated in the state in which a battery 500 which supplies power to the storage device 50 is charging. The non-charging mode may be a mode in which the storage device 50 is operated in the state in which the battery 500 which supplies power to the storage device 50 is not charging. Each of the background operations may consume more power or have high execution frequency in a charging condition than in a non-charging condition. The trigger conditions for the background operations may be mitigated (reference values thereof may be set to be low) in the charging condition compared to the non-charging condition. Therefore, in the charging condition indicating the state in which power is stabilized, each background operation may be more frequently performed, and the reliability, durability, and lifespan of the memory device 100 may be increased.

The background controller 220 may receive from the host 300 charging information indicating whether the battery 500 is in a charging state. For example, the background controller 220 may receive from the host 300, as a command, a UFS protocol information unit (UPIU) including the charging information. The UPIU may include specification information depending on a wireless charging method.

The background controller 220 may change a trigger condition for each background operation from the non-charging condition to the charging condition depending on the charging information. For example, the background controller 220 may set the trigger condition for the background operation to the charging condition in response to the charging information indicating that the battery 500 is in a charging state. The background controller 220 may set the trigger condition for the background operation to the non-charging condition in response to the charging information indicating that the battery 500 is in a non-charging state. The background controller 220 may control the corresponding background operation on the memory device 100 based on the set trigger condition for each background operation.

The host 300 may determine whether the battery 500 is in a charging state based on a signal received from a charger 400. The host 300 may provide the background controller 220 with the charging information indicating whether the battery 500 is in a charging state.

The charger 400 may use a wired charging method and a wireless charging method. The wireless charging method may use the Qi specification of the Wireless Power Consortium (WPC) or the PowerMat specification of Power Matters Alliance (PMA).

The battery 500 may be supplied with power from the charger 400 and may provide the charged power to the storage device 50. In other embodiments, the battery 500 may be disposed in the storage device 50.

Figure 2:
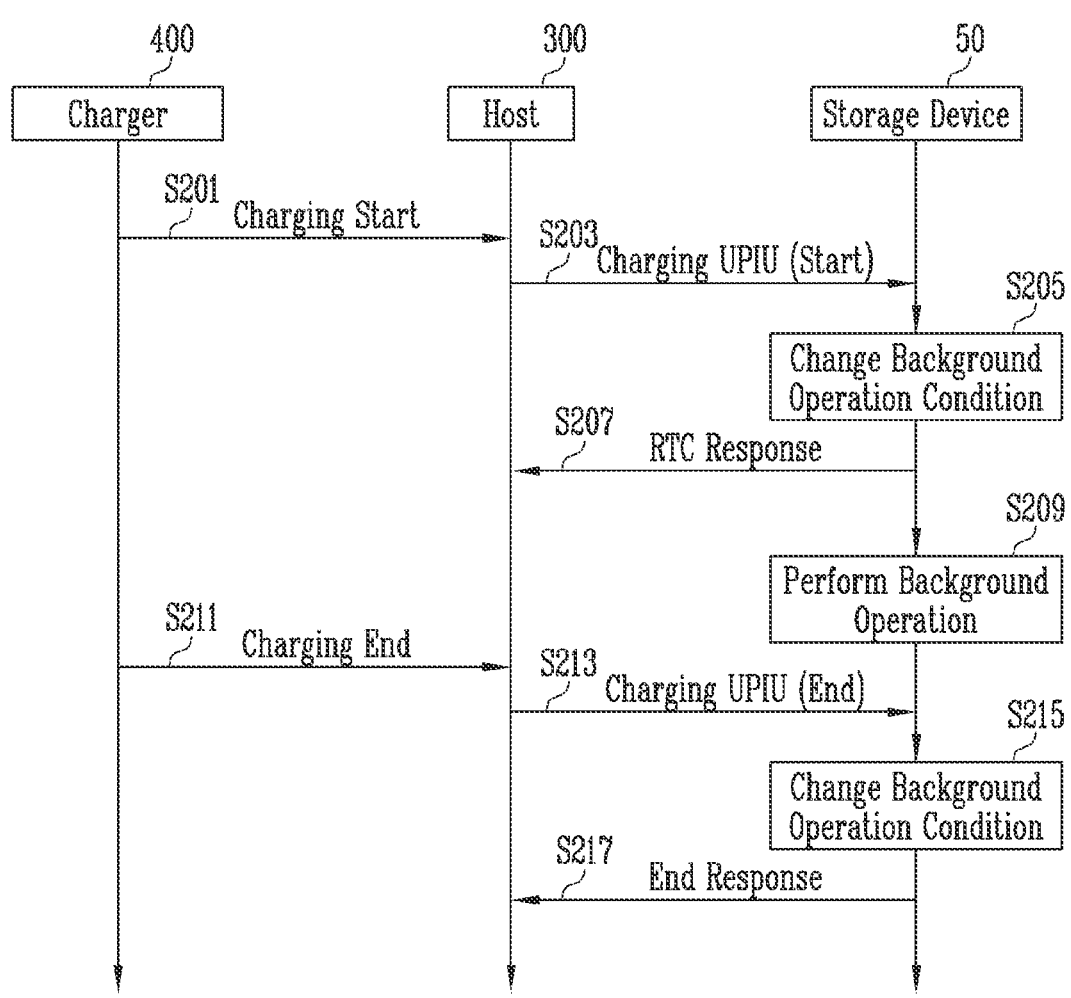
FIG. 2 is a sequence diagram illustrating a process of changing a trigger condition for a background operation according to an embodiment of the present disclosure.

FIG. 2 is a sequence diagram illustrating a process of changing a trigger condition for a background operation according to an embodiment of the present disclosure.

Referring to FIG. 2, at operation S201, the charger 400 may start the charging of the battery 500 and may provide a charging signal to the host 300.

At operation S203, the host 300 may provide the storage device 50 with a UFS protocol information unit (UPIU) that includes charging information indicating charging start, as a command. The host 300 may determine whether the battery is in a charging state based on the charging signal received from the charger 400.

At operation S205, the storage device 50 may change a trigger condition for the corresponding background operation from a non-charging condition to a charging condition based on the charging information indicating charging start. The trigger condition for the background operation may be mitigated in the charging condition compared to the non-charging condition. For example, the background operation may consume more power or have high execution frequency in the charging condition than in the non-charging condition.

At operation S207, the storage device 50 may provide to the host 300 a response indicating that the battery is charging (i.e., a Ready to Charging (RTC) Response).

At operation S209, the storage device 50 may perform the corresponding background operation depending on the trigger condition for the background operation set to the charging condition.

At operation S211, the charger 400 may terminate charging (i.e., charging end), and may provide a charging end signal to the host 300.

At operation S213, the host 300 may provide the storage device 50 with a UPIU that includes charging information indicating the charging end, as a command.

At operation S215, the storage device 50 may change the trigger condition for the corresponding background operation from the charging condition to the non-charging condition based on the charging information indicating the charging end.

At operation S217, the storage device 50 may provide to the host 300 a response indicating that the end of charging has been recognized.

Figure 3:
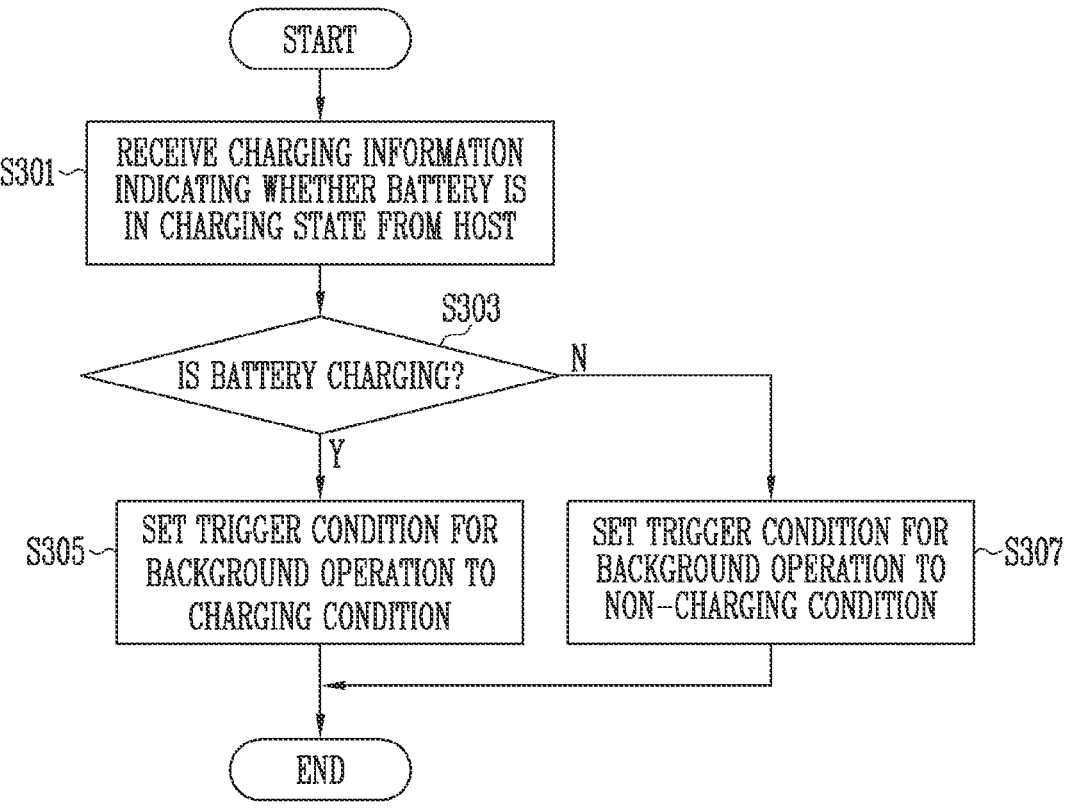
FIG. 3 is a flowchart illustrating the operation of a memory controller according to an embodiment of the present disclosure.

FIG. 3 is a flowchart illustrating the operation of a memory controller 200 according to an embodiment of the present disclosure.

Referring to FIGS. 1 and 3, at operation S301, the memory controller 200 may receive from the host 300 charging information indicating whether the battery 500 which supplies power to the memory controller 200 is in a charging state.

At operation S303, the memory controller 200 may determine whether the battery 500 is charging based on the charging information. As a result of the determination, when it is determined that the battery 500 is in a charging state, the process may proceed to operation S305, whereas when it is determined that the battery 500 is in a non-charging state, the process may proceed to operation S307.

At operation S305, the memory controller 200 may set to a charging condition a trigger condition for a background operation. For example, when a trigger condition for a previous background operation is set to a non-charging condition, the memory controller 200 may change the trigger condition for the background operation from the non-charging condition to the charging condition. When the trigger condition for the previous background operation is set to a charging condition, the memory controller 200 may maintain the trigger condition for the background operation in the charging condition.

At operation S307, the memory controller 200 may set to the non-charging condition the trigger condition for the background operation. For example, when the trigger condition for the previous background operation is set to a charging condition, the memory controller 200 may change the trigger condition for the background operation from the charging condition to the non-charging condition. When the trigger condition for the previous background operation is set to a non-charging condition, the memory controller 200 may maintain the trigger condition for the background operation in the non-charging condition.

Figure 4:
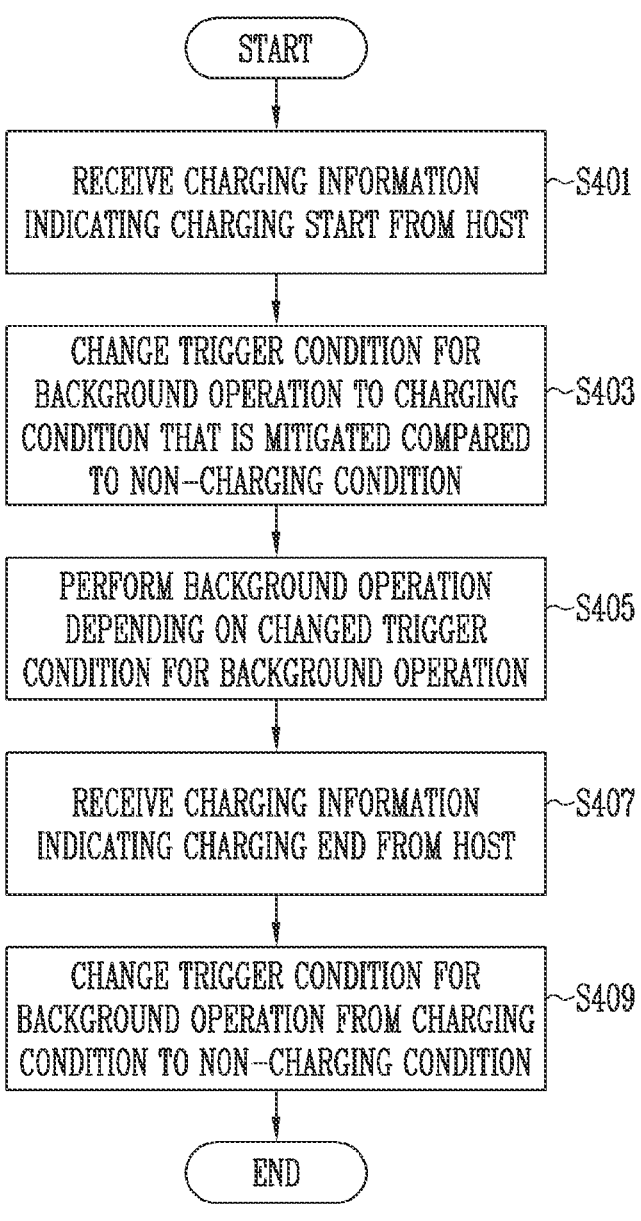
FIG. 4 is a flowchart illustrating the operation of a memory controller according to an embodiment of the present disclosure.

FIG. 4 is a flowchart illustrating the operation of a memory controller 200 according to an embodiment of the present disclosure.

Referring to FIGS. 1 and 4, at operation S401, the memory controller 200 may receive from the host 300 charging information indicating charging start.

At operation S403, the memory controller 200 may change a trigger condition for a background operation to a charging condition that is mitigated compared to a non-charging condition.

At operation S405, the storage device 200 may perform a background operation depending on the changed trigger condition for the background operation.

At operation S407, the memory controller 200 may receive from the host 300 charging information indicating charging end.

At operation S409, the memory controller 200 may change the trigger condition for the background operation from the charging condition to the non-charging condition.

FIG. 5 is a diagram illustrating a background condition storage in which conditions regarding garbage collection are stored according to an embodiment of the present disclosure.

Referring to FIG. 5, the background condition storage may store a condition regarding a dirty level for triggering garbage collection. The dirty level may indicate the necessity for free blocks to be secured through garbage collection. The dirty level may be A1 in a non-charging condition and may be A2 in a charging condition. A2 may be a level less than A1. Therefore, even though the necessity for free blocks is lower in the charging condition than in the non-charging condition, garbage collection may be performed. A frequency with which garbage collection is performed in the charging condition may be greater than that in the non-charging condition.

The background condition storage may store a condition regarding an invalid page count based on which a victim block is selected on which garbage collection is to be performed. The invalid page count may be B1 in the non-charging condition and may be B2 in the charging condition. B2 may be a value less than B1. Therefore, in the charging condition, a memory block having an invalid page count less than that in the non-charging condition may also be selected as a victim block on which garbage collection is to be performed. Because the number of victim blocks in the charging condition becomes greater than that in the non-charging condition, the frequency with which garbage collection is performed may be greater than that in the charging condition.

Figure 6A:
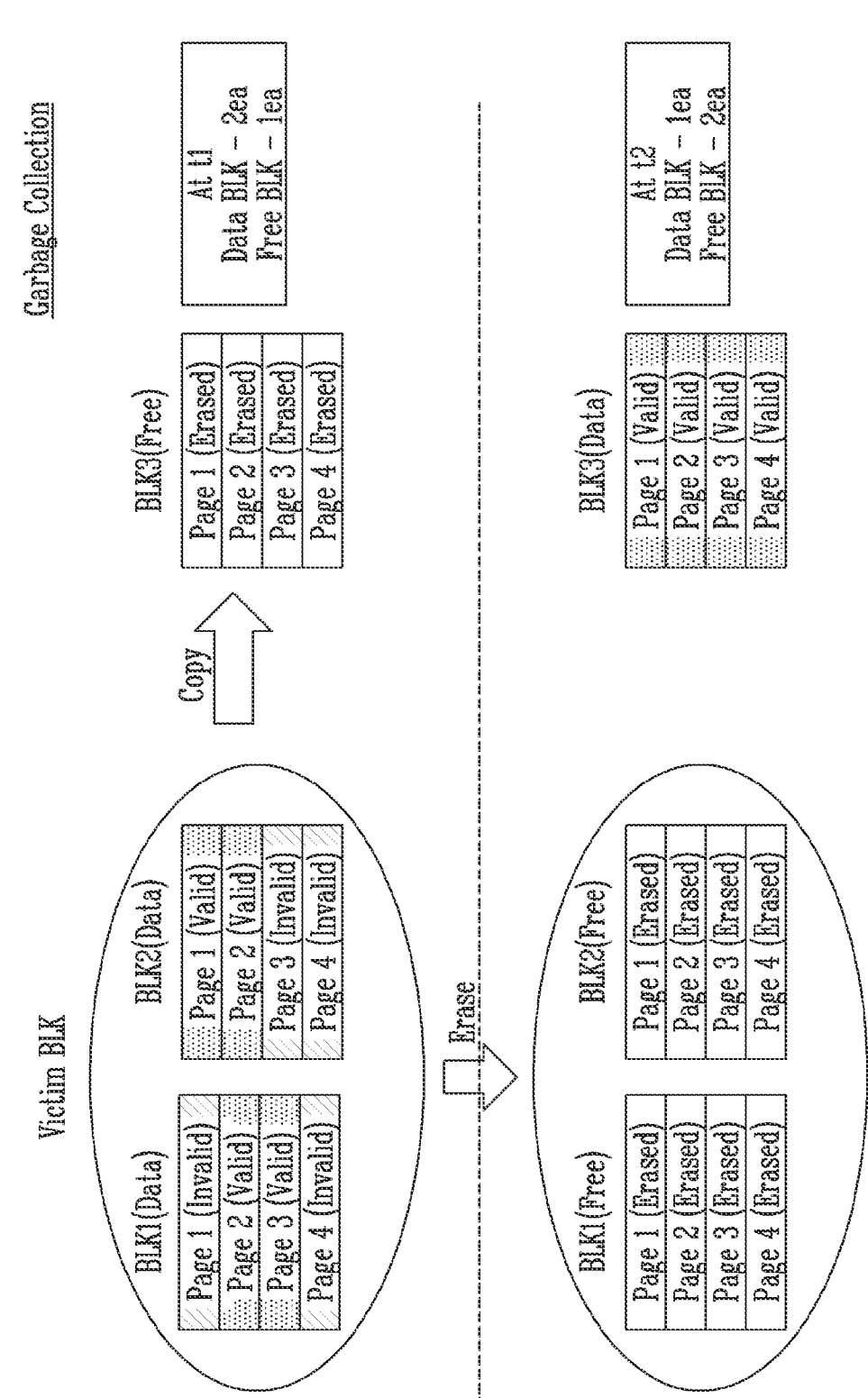
FIG. 6A is a diagram illustrating garbage collection among background operations.

FIG. 6A is a diagram illustrating garbage collection among background operations.

Referring to FIG. 6A, garbage collection may be an operation of copying valid page data stored in the victim blocks to other memory blocks, erasing the victim blocks, and then securing free blocks.

At a time point t1, first and second memory blocks BLK1 and BLK2 may be victim blocks on which garbage collection is to be performed. At a time point t2 that is the time after garbage collection is performed, valid page data stored in the first and second memory blocks BLK1 and BLK2 may be copied to a third memory block BLK3, and the first and second memory blocks BLK1 and BLK2 may be erased. When comparing the time point t1 with the time point t2, it can be seen that invalid page data is erased and the number of free blocks is secured through garbage collection.

Figure 6B:
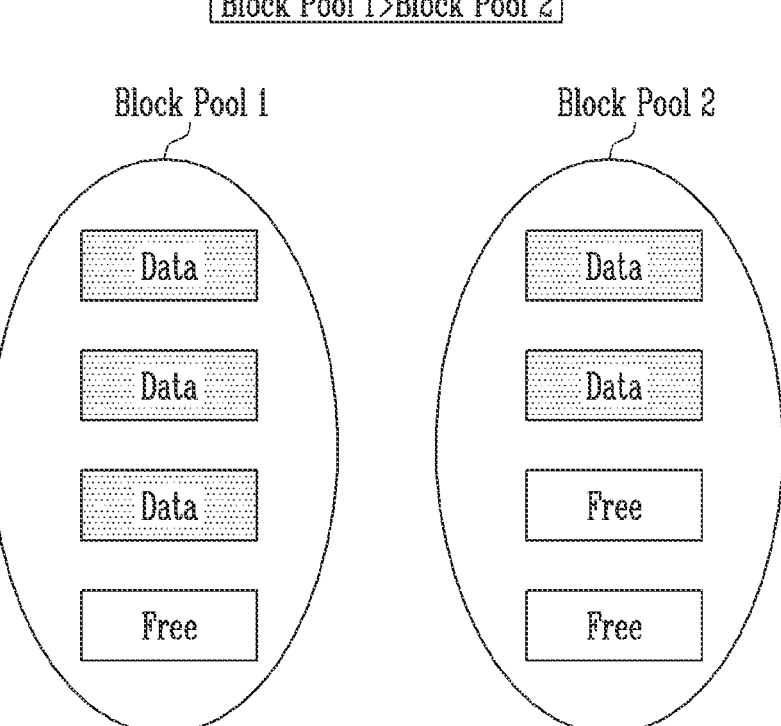
FIG. 6B is a diagram illustrating a dirty level that is a trigger condition for garbage collection.

FIG. 6B is a diagram illustrating a dirty level that is a trigger condition for garbage collection.

Referring to FIG. 6B, data blocks may be memory blocks in which data is stored, and free blocks may be memory blocks in which new data can be stored. A first block pool (Block Pool 1) may include three data blocks and one free block, and a second block pool (Block Pool 2) may include two data blocks and two free blocks.

Therefore, because the number of free blocks in the first block pool (Block Pool 1) is less than that in the second block pool (Block Pool 2), there may be a higher need to secure free blocks through garbage collection. Therefore, the dirty level in the first block pool (Block Pool 1) may be greater than that in the second block pool (Block Pool 2).

FIG. 7 is a diagram illustrating a background condition storage in which conditions regarding a read reclaim operation are stored according to an embodiment of the present disclosure.

Referring to FIG. 7, the background condition storage may store the condition regarding a read count for triggering a read reclaim operation. The read count may be the number of read operations performed on a memory block. The read count may be counted on a super-block basis as well as on a memory block basis. The read count may be C1 in a non-charging condition and may be C2 in a charging condition. C2 may be a value less than C1. Therefore, in the charging condition, a memory block having a read count less than that in the non-charging condition may also be selected as a block on which a read reclaim operation is to be performed. Because, in the charging condition, the number of blocks on which the read reclaim operation is to be performed increases compared to the non-charging condition, the frequency with which the read reclaim operation is performed may be greater.

The background condition storage may store a condition regarding the number of error bits in a test read based on which blocks on which a read reclaim operation is to be performed are selected. The test read may be performed on a page selected from among a plurality of pages included in each memory block. For example, the test read may be performed on a page programmed last among the pages included in the memory block. When the number of error bits is greater than or equal to a reference value (threshold value) as a result of the test read, a read reclaim operation may be performed on the corresponding memory block. The number of error bits may be D1 in the non-charging condition and may be D2 in the charging condition. D2 may be less than D1. Therefore, in the charging condition, a memory block having error bits less than those in the non-charging condition may also be selected as a block on which the read reclaim operation is to be performed. Therefore, because, in the charging condition, the number of blocks on which the read reclaim operation is to be performed increases compared to the non-charging condition, the frequency with which the read reclaim operation is performed may be greater.

The background condition storage may store a condition regarding a test read interval based on which blocks are selected on which the read reclaim operation is to be performed. The test read interval may be E1 in the non-charging condition and may be E2 in the charging condition. E2 may be shorter than E1. Therefore, because the test read is more frequently performed in the charging condition than in the non-charging condition, the frequency at which the read reclaim operation is performed may be greater than that in the charging condition.

Figure 8A:
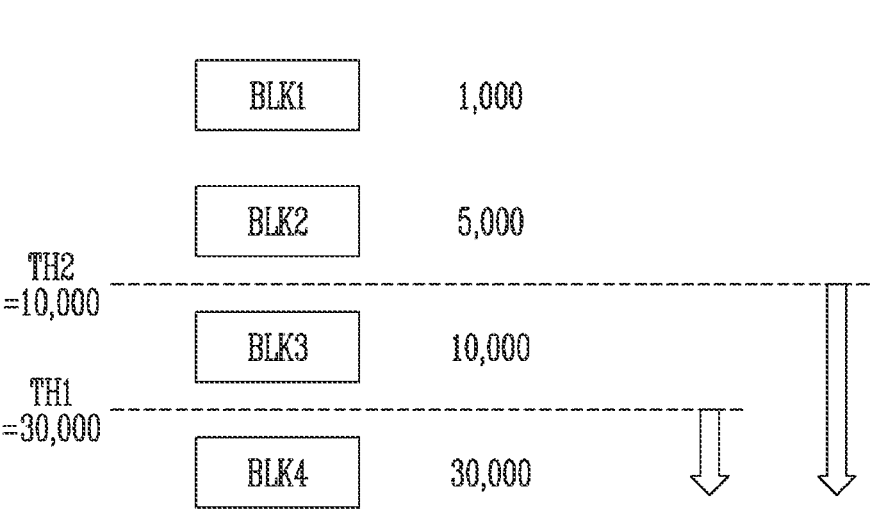
FIG. 8A is a diagram illustrating a read reclaim operation among background operations and a read count that is a trigger condition for the read reclaim operation.

FIG. 8A is a diagram illustrating a read reclaim operation among background operations, which is performed based on a read count that is a trigger condition for the read reclaim operation.

Referring to FIG. 8A, respective read counts for first to fourth memory blocks BLK1 to BLK4 may be 1,000, 5,000, 10,000, and 30,000. The read count may be the number of read operations performed on each memory block. The read reclaim operation may be an operation of copying data stored in a memory block for which a read count is greater than or equal to a threshold value, to another memory block. When the read count is higher, a read disturb in the memory block increases. Therefore, when the read count is greater than or equal to the threshold value, a read reclaim operation may be performed.

For example, because a first threshold value TH1 is 30,000, the read reclaim operation may be performed on the fourth memory block BLK4. Because a second threshold value TH2 is 10,000, the read reclaim operation may be performed on the third and fourth memory blocks BLK3 and BLK4. As the threshold value of the read count for triggering the read reclaim operation becomes lower, the number of blocks on which the read reclaim operation is to be performed increases, and thus the read reclaim operation may be frequently performed.

FIG. 8B is a diagram illustrating the number of error bits that is a trigger condition for a read reclaim operation.

Referring to FIG. 8B, as a result of a test read on memory blocks, the numbers of error bits of first to fourth memory blocks BLK1 to BLK4 may be 10, 20, 30, and 15, respectively. As a result of the test read, as the number of error bits is larger, data recovery probability may become lower, whereby a read reclaim operation may be performed when the number of error bits is greater than or equal to a threshold value.

For example, because a first threshold value TH1 is 30, the read reclaim operation may be performed on the third memory block BLK3. Because a second threshold value TH2 is 20, the read reclaim operation may be performed on the second and third memory blocks BLK2 and BLK3. As the threshold value of the number of error bits for triggering the read reclaim operation becomes lower, the number of blocks on which the read reclaim operation is to be performed increases, and thus the read reclaim operation may be frequently performed.

Figures 8C, 9:
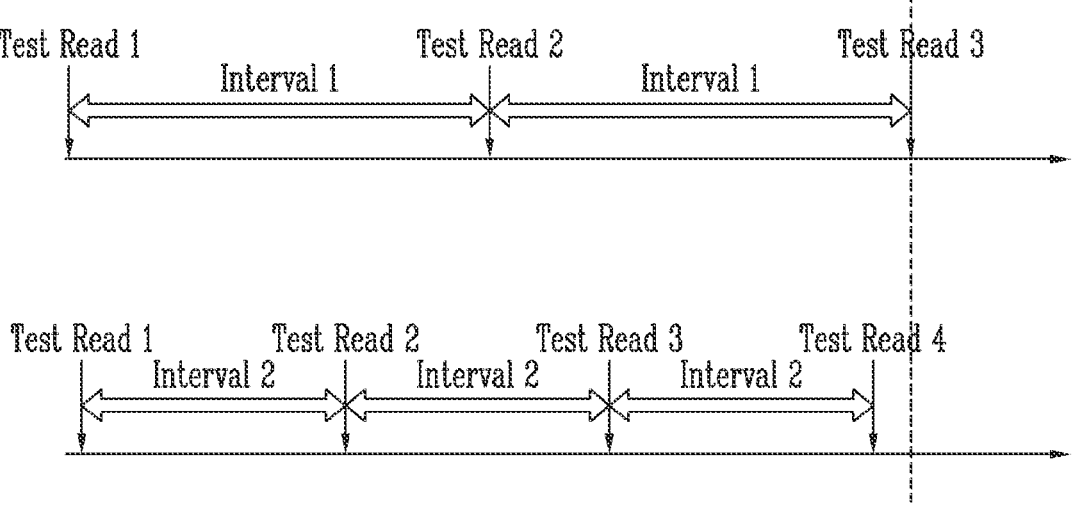
FIG. 8C is a diagram illustrating a test read interval in a read reclaim operation.
FIG. 9 is a diagram illustrating a background condition storage in which conditions regarding wear leveling are stored according to an embodiment of the present disclosure.

FIG. 8C is a diagram illustrating a test read interval in a read reclaim operation.

Referring to FIG. 8C, first to third test reads (Test Read 1 to Test Read 3) may be performed at each first interval (Interval 1). The first to fourth test reads (Test Read 1 to Test Read 4) may be performed at each second interval (Interval 2) shorter than the first interval (Interval 1). That is, as the interval at which the test read is performed is shorter, the test read is more frequently performed, and thus a memory block on which a read reclaim operation is to be performed may be more frequently detected. Therefore, as the interval of the test read at which the block on which the read reclaim operation is to be performed is selected becomes shorter, the read reclaim operation may be frequently performed.

FIG. 9 is a diagram illustrating a background condition storage in which conditions regarding wear leveling are stored according to an embodiment of the present disclosure.

Referring to FIG. 9, the background condition storage may store a condition regarding erase/write (E/W) count based on which a block on which wear leveling is to be performed is selected. The erase/write count may be F1 in a non-charging condition and may be F2 in a charging condition. F2 may be less than F1. Therefore, in the charging condition, a memory block having an erase/write count less than that in the non-charging condition may also be selected as a block on which wear leveling is to be performed. Because the number of blocks on which wear leveling is to be performed in the charging condition becomes greater than that in the non-charging condition, the frequency with which wear leveling is performed may be higher.

In various embodiments, the erase/write count may be replaced and used with an erase count or a write count.

Figure 10:
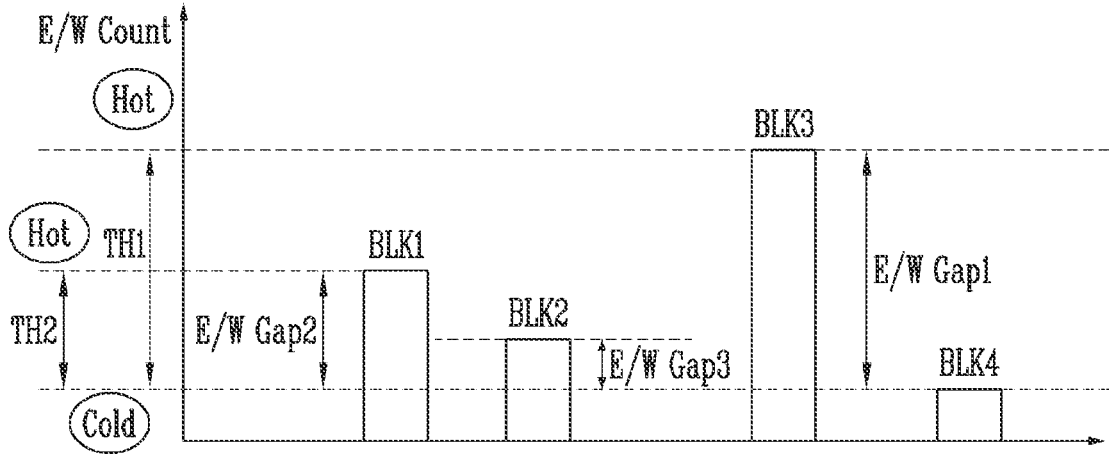
FIG. 10 is a diagram illustrating wear leveling among background operations and an erase/write count that is a trigger condition for wear leveling.

FIG. 10 is a diagram illustrating wear leveling among background operations, which is performed based on an erase/write count that is a trigger condition for wear leveling.

Referring to FIG. 10, wear leveling may be an operation of shifting data stored in a hot block having a relatively high erase/write count to a cold block having a relatively low erase/write count, based on memory blocks for which erase/write count gaps are greater than or equal to a threshold value. As the erase/write count is higher, the wear level of the corresponding memory block may increase. Therefore, data stored in a hot block having a high wear level may be shifted to a cold block having a low wear level through wear leveling, and the wear levels of memory blocks may be maintained at a similar level, thus enabling the lifespan of the memory device to be lengthened.

When an erase/write count gap for triggering wear leveling is a first threshold value TH1, the third memory block BLK3 may be a hot block, whereby wear leveling may be performed on the third memory block BLK3. When the erase/write count gap is a second threshold value TH2, the first and third memory blocks BLK1 and BLK3 may be hot blocks, whereby wear leveling may be performed on the first and third memory blocks BLK1 and BLK3.

As the threshold value of the erase/write count gap for triggering wear leveling becomes lower, the number of blocks on which wear leveling is to be performed increases, and thus wear leveling may be frequently performed.

Figure 11:
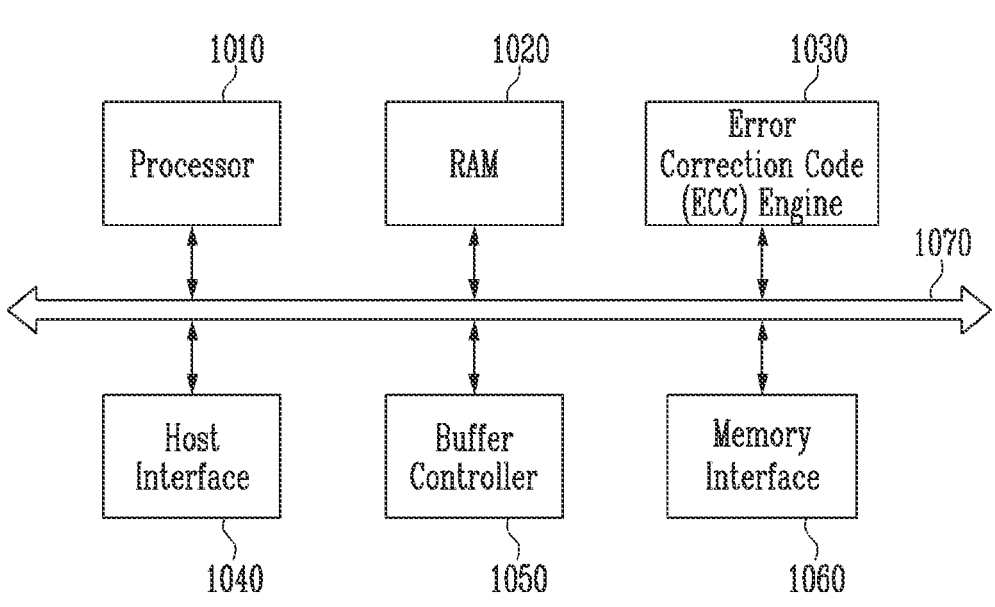
FIG. 11 is a diagram illustrating an embodiment of a memory controller of FIG. 1.

FIG. 11 is a diagram illustrating an embodiment of a memory controller of FIG. 1.

Referring to FIG. 11, a memory controller 1000 may be coupled to a host and a memory device as shown in FIG. 1. The memory controller 1000 may access the memory device in response to a request received from the host.

The memory controller 1000 may control write, read, erase and background operations of the memory device. The memory controller 1000 may provide an interface between the memory device and the host. The memory controller 1000 may run firmware for controlling the memory device.

The memory controller 1000 may include a processor 1010, a random access memory (RAM) 1020, an error correction code (ECC) engine 1030, a host interface 1040, a buffer controller 1050, a memory interface 1060, and a bus 1070.

The bus 1070 may provide a channel between components of the memory controller 1000.

The processor 1010 may control the overall operation of the memory controller 1000 and perform a logical operation. The processor 1010 may communicate with the host through the host interface 1040 and communicate with the memory device through the memory interface 1060. Further, the processor 1010 may communicate with the RAM 1020 through the buffer controller 1050. The processor 1010 may control the operation of the storage device by using the RAM 1020 as a working memory, a cache memory, or a buffer memory.

The processor 1010 may translate a logical block address (LBA), provided by the host, into a physical block address (PBA). A flash translation layer (FTL) which may be included in the processor 1010 may receive the LBA and translate the LBA into the PBA using a mapping table. Examples of an address mapping method may include various methods according to a mapping unit. Representative address mapping methods may include a page mapping method, a block mapping method, and a hybrid mapping method.

When the memory device is a nonvolatile memory, the processor 1010 may randomize data received from the host. The randomized data may be provided and programmed to the memory device.

The processor 1010 may derandomize data received from the memory device during a read operation. For example, the processor 1010 may derandomize the data received from the memory device using a derandomizing seed and may output the derandomized data to the host.

In an embodiment, the processor 1010 may run software or firmware to perform the randomizing and derandomizing operations.

The RAM 1020 may be used as a working memory, a cache memory, or a buffer memory of the processor 1010. The RAM 1020 may store codes and commands to be executed by the processor 1010. The RAM 1020 may store data that is processed by the processor 1010. The RAM 1020 may include a static RAM (SRAM) or a dynamic RAM (DRAM).

The ECC engine 1030 may perform error correction. The ECC engine 1030 may perform ECC encoding based on data to be written to the memory device through the memory interface 1060. The ECC-encoded data may be transferred to the memory device through the memory interface 1060. The ECC engine 1030 may perform ECC decoding on data received from the memory device through the memory interface 1060. In an example, the ECC engine 1030 may be included in the memory interface 1060 as the component of the memory interface 1060.

The host interface 1040 may communicate with the host under the control of the processor 1010. The host interface 1040 may perform communication using at least one of various communication standards or interfaces such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

The buffer controller 1050 may control the RAM 1020 under the control of the processor 1010. The memory interface 1060 may transmit/receive commands, addresses, and data to/from the memory device through channels under the control of the processor 1010.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may transmit data in the memory controller 1000, and the control bus may transmit control information, such as commands or addresses, in the memory controller 1000. The data bus and the control bus may be separated from each other and may neither interfere with each other nor influence each other. The data bus may be coupled to the host interface 1040, the buffer controller 1050, the ECC engine 1030, and the memory interface 1060. The control bus may be coupled to the host interface 1040, the processor 1010, the buffer controller 1050, the RAM 1020, and the memory interface 1060.

According to embodiments of the present disclosure, there are provided a storage device which performs background operations in a stabilized power state, and a method of operating the storage device.

While the present disclosure has been illustrated and described with respect to specific embodiments, the disclosed embodiments are provided for description, and are not intended to be restrictive. Further, it is noted that the present disclosure may be achieved in various ways through substitution, change, and modification that fall within the scope of the following claims, as those skilled in the art will recognize in light of the present disclosure. Furthermore, the embodiments may be combined to form additional embodiments.

What is claimed is:

1. A memory controller comprising:
a background condition storage configured to store a trigger condition for each background operation for a memory device; and
a background controller configured to change the trigger condition from a non-charging condition to a charging condition depending on charging information indicating whether the battery for the memory controller is in a charging state,
wherein the trigger condition is mitigated in the charging condition compared to the non-charging condition, and
wherein the background operation consumes more power or has a higher execution frequency in the charging condition than that in the non-charging condition.

2. The memory controller according to claim 1, wherein the background controller is configured to receive the charging information from a host, set the trigger condition to the charging condition in response to charging information indicating that the battery is in the charging state, and set the trigger condition to the non-charging condition in response to charging information indicating that the battery is in a non-charging state.

3. The memory controller according to claim 2, wherein:
the background controller is configured to control each background operation of the memory device based on the set trigger condition.

4. The memory controller according to claim 1, wherein:
the background condition storage is configured to store, as the trigger condition, a condition regarding a dirty level for triggering garbage collection among background operations, and the dirty level indicates a necessity for a free block of the memory device to be secured through the garbage collection and is less in the charging condition than in the non-charging condition.

5. The memory controller according to claim 1, wherein:
the background condition storage is configured to store, as the trigger condition, a condition regarding a reference invalid page count based on which corresponding memory block of the memory device is selected as a victim block on which garbage collection among background operations is to be performed, and
the reference invalid page count is less in the charging condition than in the non-charging condition.

6. The memory controller according to claim 1, wherein:
the background condition storage is configured to store, as the trigger condition, a condition regarding a reference read count for triggering a read reclaim operation among background operations, and
the reference read count is less in the charging condition than in the non-charging condition.

7. The memory controller according to claim 1, wherein:
the background condition storage is configured to store, as the trigger condition, a condition regarding a reference number of error bits for a test read of the memory device based on which block of the memory device is selected on which a read reclaim operation among background operations is to be performed, and
the reference number of error bits is less in the charging condition than in the non-charging condition.

8. The memory controller according to claim 1, wherein:
the background condition storage is configured to store, as the trigger condition, a condition regarding a reference interval for a test read of the memory device based on which block of the memory device is selected on which a read reclaim operation among background operations is to be performed, and
the reference interval for the test read is shorter in the charging condition than in the non-charging condition.

9. The memory controller according to claim 8, wherein the test read is performed on a page programmed last among pages included in a memory block of the memory device.

10. The memory controller according to claim 1, wherein:
the background condition storage is configured to store, as the trigger condition, a condition regarding a reference erase or write count on which block of the memory device is selected on which wear leveling among background operations is to be performed, and
the reference erase or write count is less in the charging condition than in the non-charging condition.

11. A method of operating a memory controller, the method comprising:
receiving, from a host, charging information indicating whether a battery for the memory controller is in a charging state;
changing a trigger condition for a background operation for a memory device to a charging condition that is mitigated compared to a non-charging condition based on the charging information; and
performing the background operation on the memory device based on the trigger condition,
wherein the background operation consumes more power or has a higher execution frequency, as the trigger condition, in the charging condition than in the non-charging condition.

12. The method according to claim 11, further comprising:

receiving from the host charging information indicating that the battery is in a non-charging state; and changing the trigger condition for the background operation from the charging condition to the non-charging condition.

13. The method according to claim 11, wherein:

performing the background operation comprises performing garbage collection based on the trigger condition of a dirty level, less than that in the non-charging condition, and the dirty level indicates a necessity for a free block of the memory device to be secured through the garbage collection.

14. The method according to claim 11, wherein performing the background operation comprises:

selecting a target block of the memory device on which a read reclaim operation is to be performed based on the trigger condition of a read count less than that in the non-charging condition; and performing the read reclaim operation on the target block.

15. The method according to claim 11, wherein performing the background operation comprises:

selecting a target block of the memory device on which a read reclaim operation is to be performed based on the trigger condition of a number of error bits less than that in the non-charging condition; and performing the read reclaim operation on the target block.

16. The method according to claim 11, wherein performing the background operation comprises:

performing a test read of the memory device at an interval shorter than that in the non-charging condition; and performing a read reclaim operation on a selected target block of the memory device depending on a result of the test read.

17. The memory controller according to claim 16, wherein the test read is performed on a page programmed last among pages included in a memory block of the memory device.

18. The method according to claim 11, wherein performing the background operation comprises:

selecting a target block of the memory device on which wear leveling is to be performed based on the trigger condition of an erase or write count less than that in the non-charging condition; and performing the wear leveling on the target block.

* * * * *